United States Patent
Rodeheffer et al.

(10) Patent No.: US 6,848,063 B2
(45) Date of Patent: Jan. 25, 2005

(54) SYSTEM AND METHOD FOR SCRUBBING ERRORS IN VERY LARGE MEMORIES

(75) Inventors: Thomas Lee Rodeheffer, Mountain View, CA (US); Erwin Oertli, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 521 days.

(21) Appl. No.: 09/989,357

(22) Filed: Nov. 20, 2001

(65) Prior Publication Data

US 2003/0097608 A1 May 22, 2003

(51) Int. Cl.⁷ .................................................. G06F 11/00
(52) U.S. Cl. ........................... 714/6; 714/5; 714/718; 714/764
(58) Field of Search ........................... 714/5, 6, 718, 714/764

(56) References Cited

U.S. PATENT DOCUMENTS

| | | | |
|---|---|---|---|
| 5,502,728 A | * | 3/1996 | Smith, III .................... 714/5 |
| 5,588,112 A | * | 12/1996 | Dearth et al. ................. 714/9 |
| 5,978,952 A | | 11/1999 | Hayek et al. ............... 714/764 |
| 6,076,183 A | | 6/2000 | Espie et al. ................ 714/764 |
| 6,101,614 A | | 8/2000 | Gonzales et al. .............. 714/6 |
| 6,349,390 B1 | * | 2/2002 | Dell et al. .................... 714/6 |
| 6,480,982 B1 | * | 11/2002 | Chan et al. ................ 714/764 |
| 6,559,671 B2 | * | 5/2003 | Miller et al. ............... 324/765 |

OTHER PUBLICATIONS

Franklin F. Kuo, Ed., *Computer Applications in Electrical Engineering Series*, Prentice–Hall, Inc., Englewood Cliffs, N.J., 1970; Chapter 8: pp. 227–254.

* cited by examiner

*Primary Examiner*—Robert Beausoliel
*Assistant Examiner*—Emerson Puente (57) ABSTRACT

Systems and methods for improving scrubbing techniques are provided. In one aspect, the error correction code for a memory line is strengthened by reorganizing the memory line into distinct portions and providing an error code set that includes a distinct error code for each portion of the memory line. In another aspect of the invention, the scan rate is effectively increased by moving memory scrubbing functionality into the memory system and distributing it among a number of subcomponents that can operate scrubbing functions in parallel. The effective scan rate increase reduces the probability of failure for any given ECC strength.

18 Claims, 4 Drawing Sheets

SYSTEM AND METHOD FOR SCRUBBING ERRORS IN VERY LARGE MEMORIES

The present invention relates generally to a system and method for correcting errors in very large random access memories using memory scrubbing techniques.

BACKGROUND OF THE INVENTION

Modern computer memories use error correcting codes (ECC) to enable correct data to be recovered in spite of the presence of occasional errors. Errors are classified as either hard or soft, depending on whether the error is permanent or transient. A stuck bit that always reads as "0" no matter what is written into it would be an example of a hard error. A bit that was written as "1" but happens accidentally to get read back as "0" would be an example of a soft error.

The error rate is typically presented as a mean time between failures (MTBF) of whatever component is under consideration. Manufacturers publish values for the hard and soft error rate MTBFs of their memory products. For example, for a representative 1 gigabit memory module, a publication may list a soft error rate MTBF of 8 to 10 years and a hard error rate MTBF of about ten times that. This means that during 8 to 10 years of operation of this memory module, one should expect to encounter one bit that is read out as the wrong value.

Modern memories are based on dynamic random access memory chips (DRAM). DRAMs periodically refresh their memory cells. In a large memory, refreshes comprise the overwhelming proportion of operations performed over time in each DRAM chip. If a soft error occurs during a refresh operation, or during a write operation, the corrupt (i.e., erroneous) bit value will be stored back into a memory cell and thus the corruption resulting from the error will persist. Subsequent, non-faulty operations will correctly read the corrupt value. To prevent the occurrence of such errors, known memory systems employ an error correction code (ECC) so that when a corrupt value is read the correct data is recoverable. But since corruption persists in memory, subsequent soft errors may eventually further corrupt an already corrupt value. Since there is a limit to the amount of corruption that an ECC can correct, it is desirable to periodically check all data in memory, recover the correct data corresponding to any corrupt value, and repair the corruption by storing the correct data back in memory. As used herein, the term "scrubbing" refers to a process of checking all data in memory and repairing corruption.

A memory is typically organized as an array of words. Each word may be considered an error correction unit that includes some number of data bits and some number of error correction bits. Depending on the particular ECC used, some set of patterns of corrupt bits can be corrected and some set of errors can be detected. Often, the set of errors that can be detected by a particular ECC is larger than the set that can be corrected. For example, a typical ECC detects a single and double corrupt bits (i.e., up to two corrupt bits per word) but is only capable of correcting a single corrupt bit (per word).

There are several known methods for repairing corrupt data discovered during scrubbing. In one such method, the CPU, or other processor, writes all words back to memory. While this method is simple, errors are presumably infrequent, and therefore most of the writing back is unnecessary. In another known method, the memory controller remembers the address of a word whenever it corrects a corrupt memory word. When the CPU learns of the address of a corrupt word, typically via an interrupt, it repairs the corrupt word by reading the word from memory and writing the word back to memory. See U.S. Pat. No. 5,978,952 to Hayek et al. Care must also be taken under this method to guarantee that all corrupt words uncovered during the scan are in fact repaired, that is, that the scan is complete. In a third approach, the memory controller itself writes back the corrected data when corruption is encountered. See U.S. Pat. No. 6,101,614 to Gonzales et al.

Generally, scrubbing methods contain some arrangement to guarantee that the read and write back of corrected data is an atomic operation in order to guarantee that no other update to the corrupt word being repaired can insert itself between the read and the write back. Such an arrangement under the approach of Gonzales et al. is the subject U.S. Pat. No. 6,076,183 to Espie et al.

Estimating Memory System MTBF due to Soft Errors

Since soft errors are presumably the result of random processes, there is typically some probability that the next word read by the memory system will contain an uncorrectable corrupt value. When an uncorrectable corrupt value is, in fact, read, the memory system has failed. In fact, if the corruption exceeds the ability of the ECC to detect errors, the memory system may not even be able to detect that it has failed. It is important to design the memory system so that it is very unlikely to ever fail. Therefore, it is important to design a scrubbing process so that the MTBF of the memory system due to soft-error-caused corruption is long enough not to be a concern.

The usual modeling assumption used to calculate MTBF due to soft errors is that each bit stored in memory independently suffers corruption according to a memoryless, Poisson random process. Such a process is characterized by a decay half-life. Based on published soft error rate MTBFs, the decay half-life of a bit in a current technology DRAM is estimated as roughly $10^{17}$ seconds.

For the purpose of estimating the memory system MTBF, a useful approximation results from considering only the effect of the scrubbing process and ignoring the effects of useful accesses by the CPU. The memory system is considered to have failed when the scrubbing process encounters an uncorrectable corrupt word. Based on these assumptions, the set of correctable corrupt bit patterns, the rate of scanning, and the size of memory, the memory system MTBF can be computed. For example, consider a $10^{17}$ second half-life for bit corruption, an error correcting code capable of correcting any single corrupt bit, $10^5$ words/second scanned for scrubbing, and a memory containing $10^{12}$ words of 100 bits in which the cost of repairing corrupt bits is not considered. With these parameters, it is estimated that each word is scanned once every $10^7$ seconds. Since a Poisson random process with decay half-life H has a probability of $0.5^{(T/H)}$ of not decaying during any interval of duration T, the probability Pr[0/b] that any given bit will not be corrupted during the interscan interval is calculated to be:

$$Pr[0/b] = 0.5^{\left[\frac{10^7}{10^{17}}\right]} = 0.9999999999306852819464$$

Based on this, the probability Pr[1/b] that any given bit will be corrupted is:

$Pr[1/b]=1-Pr[0/b]=0.0000000000693147180536$

Since there are 100 bits per word and by assumption errors are independent, the probability Pr[0/w] that no bits in a given word are corrupted is:

$Pr[0/w]=Pr[0/b]^{100}=0.9999999930685282184232$

To calculate the probability Pr[1/w] that exactly one bit in a word is corrupted, the choices are enumerated. There are 100 ways to choose which one bit to corrupt. Combining the conditional probabilities achieves:

$$Pr[1/w]=100*Pr[1/b]*(Pr[0/b]^{99})=0.00000000693147175777944$$

Based on this, the probability Pr[>1/w] that more than one bit in a word will be corrupted is calculated to be:

$$Pr[>1/w]=1-Pr[0/w]-Pr[1/w]=0.0000000000000000237824$$

Since the assumed error correction code cannot correct more than one corrupt bit in a word, this last probability is the probability of memory system failure each time a word is scanned.

If a failure happens with probability F, then the probability of no failure in X independent trials is $(1-F)^x$. To calculate the expected number of trials before a failure, an X such that $(1-F)^x=0.5$ must be found. The solution is $X=\ln(0.5)/\ln(1-F)$. Based on this solution, it is expected that about $3*10^{16}$ words will be scanned between failures. At a scan rate of $10^5$ words/second, the memory system MTBF works out to $3*10^{11}$ seconds, or about 10 thousand years. This generally exceeds any reasonable operational life time, so the memory system is very unlikely ever to fail due to soft-error induced corruption.

For a second example, consider the case in which the same parameters are used and the memory size is increased by a factor of 100 to $10^{14}$ words. This increases the interscan interval to $10^9$ seconds. In this case the probabilities work out to:

$$Pr[0/b]=0.999999930685282184232$$

$$Pr[1/b]=0.000000069314717815768$$

$$Pr[0/w]=0.9999993068530596665061$$

$$Pr[1/w]=0.0000006931467025093613$$

$$Pr[>1/w]=0.00000000000002378241325$$

where about $3*10^{12}$ words are scanned between failures, for a MTBF of $3*10^7$ seconds, or about 1 year. This is an uncomfortably small number for a memory system that is so large. Presumably, a system with so much memory would be intended for running programs of very long duration.

Tradeoff Between Scanning Rate, Memory Size, and MTBF

If the scrubbing process is configured to scan more words per second, then the interval between successive checks of the same word decreases, and the probability decreases that any given word accumulates an uncorrectable amount of corruption during the interval between checks. Therefore, an increase in the scanning rate results in an increase in the memory system MTBF. In contrast, if the number of words in the memory is increased, then the interval between successive checks of the same word is lengthened, and the memory system MTBF decreases. One approach to retain the same MTBF as memory size increases is to increase the scanning rate. However, CPU-based scanning methods can only increase their scanning rate by a limited amount before the memory bus bandwidth required for scanning becomes unacceptable.

Current Trends

In current trends, memory bandwidth is increasing over time but memory size is increasing at a faster rate. Therefore, the trend over time has been for the minimum acceptable interval required to scan all words in memory to increase. This trend may be understood by observing how bandwidth and size scale with the characteristic feature length, L, of the underlying integrated circuit fabrication technology. Basically, memory bandwidth, limited mostly by clock frequency, scales as 1/L and memory size, limited mostly by density, scales as $1/L^2$. Current large memory systems consist of many CPU's each attached via a separate memory bus to a fraction of the total system memory. However, even in these systems, the trend for aggregate memory size to increase faster than aggregate memory bandwidth is observed.

The historical trend shows a decrease in the soft error rate per bit. This decrease has been so remarkable that the soft error rate per chip has decreased even though the number of bits per chip has increased steadily. Historically, however, the major contributor to the soft error rate has been glitches in the operation of the logic that reads and refreshes the data stored in the chip. Therefore, published soft error rates vary depending on the operation workload. As memories become ever more dense, with fewer and fewer electrons stored per bit, it is expected that spontaneous decay will become a more significant problem and the soft error rate per bit may start to increase. Such an effect, increased soft error rate per bit as the bit density increases, may be observed in current disk technology.

As memory size continues to increase faster than memory bandwidth, and the soft error rate per bit stops decreasing, CPU scanning will eventually be found insufficient to scrub memory at a rate that produces an acceptable MTBF. With the parameters used in the example above, this difficulty becomes apparent when memory size reaches approximately $10^{14}$ words. This represents a total memory size of $10^{16}$ bits, which is larger than that found in current computer systems. However, computer systems with such memory sizes would have great utility.

Given the above background, what is needed in the art are systems and methods that provide memory correction techniques to support large memory systems.

SUMMARY OF THE INVENTION

The present invention provides systems and methods for improving memory scrubbing techniques. In one aspect of the invention, the scan rate is effectively increased by moving the scrubbing function into the memory system and distributing it among a number of subcomponents that operate in parallel. This produces an increase in the effective scan rate, which reduces the probability of failure for any given ECC strength. In another aspect of the invention, the ECC is strengthened in order to decrease the probability of failure for any given scan rate.

One embodiment of the present invention provides a memory system that includes a memory bus and a plurality of memory modules coupled to the memory bus. Each memory module includes a memory array, code array, access logic, error logic and a scheduler. The memory array is organized for access into a plurality of memory lines. The code array stores error codes, including a distinct error code for each of the memory lines in the memory array. The access logic accesses memory lines in the memory array. When the access logic writes data to memory, the access logic uses an error encoder to generate ECC bits that correspond to the data. The error logic in the memory system is coupled to the memory array and the code array. The error logic determines whether any specified memory line in the memory array is inconsistent with the corresponding error code in the code array. When an inconsistency is detected, a corresponding error detection signal is generated. The scheduler is coupled to the access logic. The scheduler initiates reading of the memory lines in the memory array in accordance with a memory scrubbing schedule. When the scheduler receives an error detection signal from the error logic, a remedial action is initiated if the error detection signal indicates that a specified memory line is not consistent with the corresponding error code in the code array. An advantage of memory systems in accordance with this embodiment is that the scan rate is effectively increased, since each memory module in the memory system may concurrently perform memory scrubbing in accordance with the memory scrubbing schedule.

Another embodiment of the present invention provides a memory module. The memory module includes a memory array that is organized for access into a plurality of memory lines of predefined size. Each such memory line has a plurality of distinct portions. The memory module further includes a code array for storing error codes. The code array includes a distinct error code set for each of the plurality of memory lines in the memory array. Each error code set includes a respective error code for each of the distinct portions of the associated memory line. The memory module further includes access logic for accessing memory lines in the memory array. Error logic is coupled to the memory array and code array. The error logic determines whether any of the portions of a specified memory line in the memory array are inconsistent with the corresponding error code in the code array. When this is the case, a corresponding error detection signal is generated. Finally, the memory module includes a scheduler coupled to the access logic. The scheduler initiates reading of memory lines in the memory array in accordance with a memory scrubbing schedule. When the scheduler receives an error detection signal, it initiates a remedial action if the error detection signal indicates that any portion of a specified memory line is not consistent with the corresponding error code in the code array. An advantage of memory modules in accordance with this embodiment is that the ECC is effectively strengthened. Furthermore, memory module architecture in accordance with this embodiment may be used to design memory systems that include a plurality of memory modules, each of which may be concurrently scanned.

BRIEF DESCRIPTION OF THE DRAWINGS

Additional objects and features of the invention will be more readily apparent from the following detailed description and appended claims when taken in conjunction with the drawings, in which:

Like reference numerals refer to the same element throughout the several views of the drawings.

DESCRIPTION OF THE PREFERRED EMBODIMENTS

Figure 1:
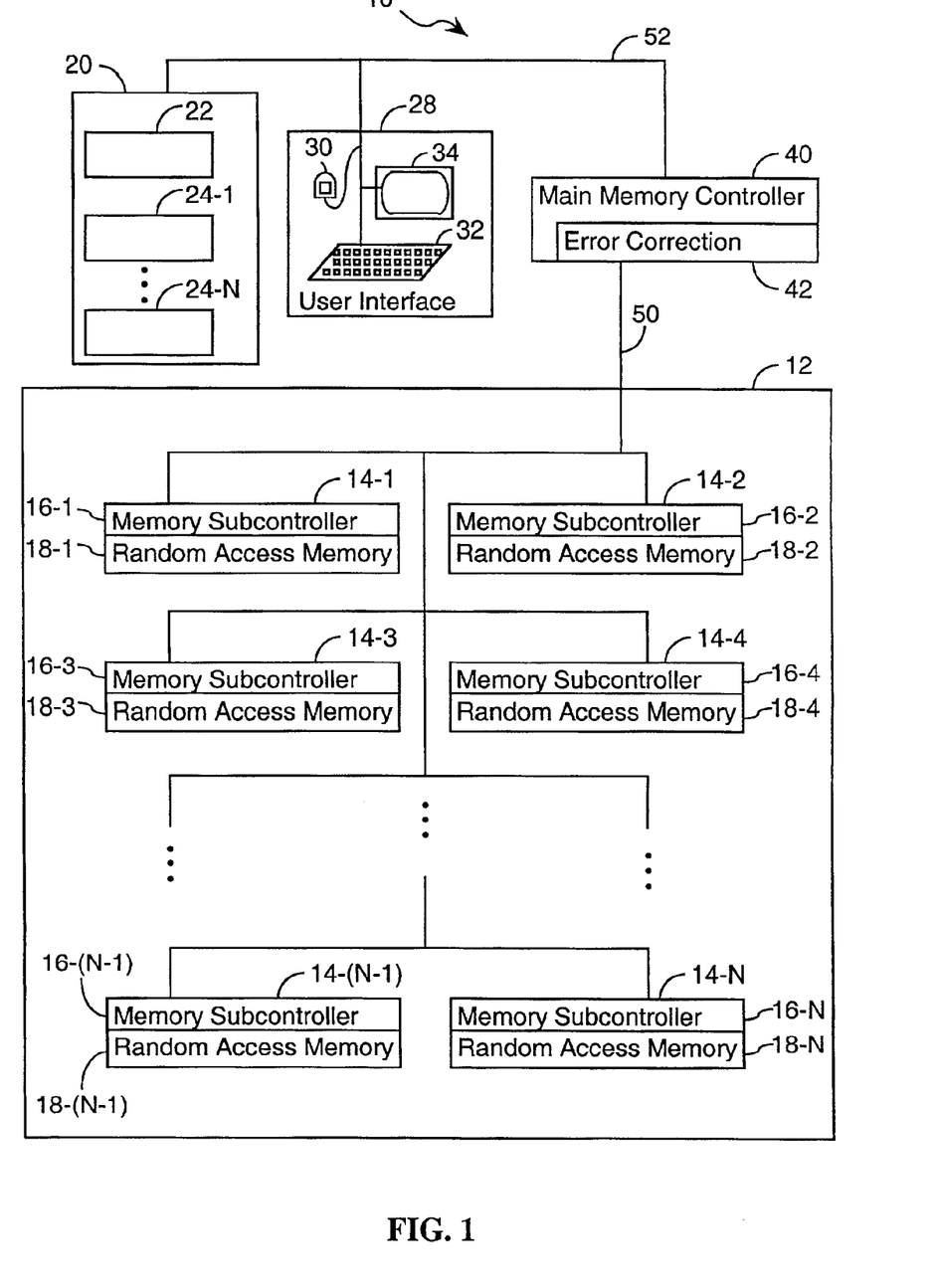
FIG. 1 is a block diagram of an exemplary system that includes a plurality of memory modules in accordance with the present invention.

FIG. 1 illustrates an improved system 10 for providing adequate scan rates to large memory systems in accordance with one embodiment of the present invention. System 10 includes a memory 12 that is divided into several memory modules 14 that are each coupled to a memory bus 50. Each memory module 14 includes a memory subcontroller 16 and a memory array 18. Memory array 18 is typically random access memory (RAM). Each subcontroller 16 has the responsibility for scanning its own RAM 18 to detect corrupt bits and to perform this task independently of the other subcontrollers 16. System 10 includes a central processing unit (CPU) 20 that includes a processor core 22, and an optional hierarchy of N levels of cache memory 24-1 to 24-N. System 10 also includes a user interface 28. In some embodiments user interface 28 includes a mouse 30, keyboard 32, and/or display 34. System 10 includes a main memory controller 40 for controlling memory 12. In some embodiments of the present invention, main memory controller 40 includes error correction logic 42. The various components of system 10 are connected by one or more communication busses 50, 52.

In one embodiment of the present invention, when a subcontroller 16 detects corrupt bits in corresponding RAM 18, the subcontroller remembers the address of the memory line containing the corrupt bits and informs CPU 20. However, at large enough memory sizes, the memory bus traffic on the communication busses 50, 52 required for the CPU to repair corrupt bits presents an unacceptable overhead, and it is preferable for the memory subcontroller 16 itself to generate and write back the corrected word.

In one aspect of the present invention, each subcontroller 16 scans memory at a slow rate during otherwise idle time. It is desirable to scan at the slowest possible rate to save power, but the rate must be fast enough to support a suitable MTBF. In another aspect of the present invention, subcontroller 16 is in charge of refresh cycles for its memory module 14. In some embodiments the subcontroller 16 is configured to include the memory scrubbing scan as part of its memory refresh activity. In yet another aspect of the invention, the scrubbing function is brought down to the chip level. In this aspect of the invention each module 14 represents a DRAM chip. In one implementation, each DRAM chip in a memory module or subsystem is designed to include scrubbing as part of its refresh cycle.

Figure 2:
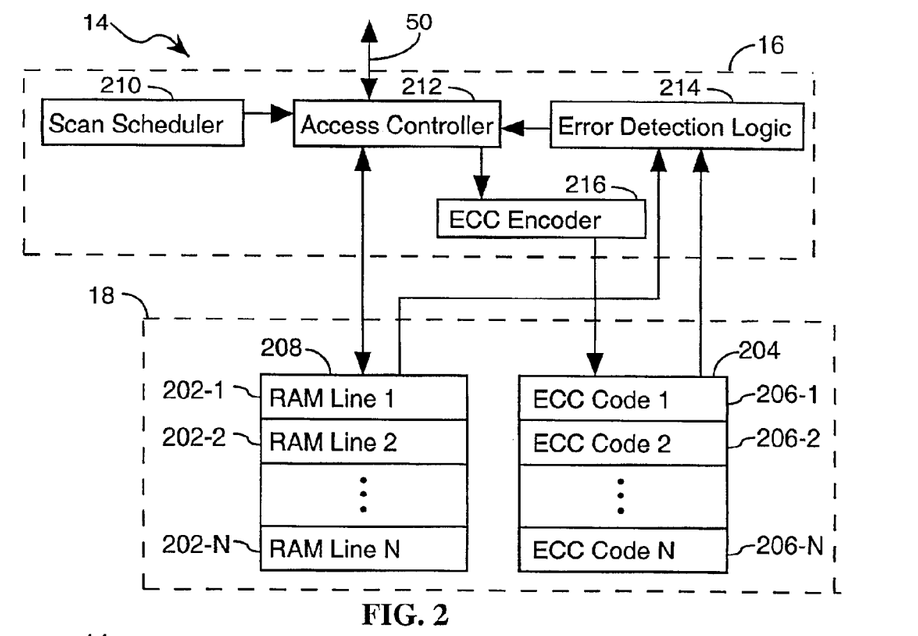
FIG. 2 is a block diagram of a memory module that includes memory controller logic and ECC RAM memory in accordance with one embodiment of the present invention.

FIG. 2 illustrates a memory module 14 in accordance with one embodiment of the present invention. The memory module 14 of FIG. 2 is advantageous because it provides a design that facilitates the concurrent scanning of each memory module 14 in memory 12. Module 14 includes a RAM 18 and a memory subcontroller 16. RAM 18 includes a memory array 208 organized for access to memory lines 202. A code array 204 in RAM 18 includes a distinct respective error code 206 for each memory line 202.

Memory subcontroller 16 of FIG. 2 comprises a scan scheduler 210, an access controller (access logic) 212, error detection logic 214, and an ECC encoder 216. Memory subcontroller is connected to other components of system 10 by bus 50. Access controller 212 is for accessing memory lines 202 in memory array 18. When access controller 212 stores data in RAM 18, the access controller stores a bit representation of the data in a RAM line 202. Furthermore, access controller 212 uses an ECC encoder 216 to generate an error correction code (ECC) that corresponds to the stored data. Error detection logic 214 is coupled to memory array 208 and code array 204 in order to determine whether any memory line 202 in memory array 208 is not consistent with the corresponding error code 206. When error detection logic 214 detects that a RAM line 202 in memory array 208 is not consistent with the corresponding error code 206 in the code array, logic 214 generates an error detection signal.

Scan scheduler 210 is coupled to access controller 212. Scan scheduler 210 initiates the reading of memory lines 202 in memory array 208 in accordance with a memory scrubbing schedule. In one embodiment of the present invention, scan scheduler 210 in each memory module 14 is configured to ensure scrubbing of each memory line 202 of memory array 208 during each successive occurrence of a predefined scrubbing time period defined by the memory scrubbing schedule. An important advantage of the present invention is that the memory scrubbing schedule used by scan scheduler 210 is not dependent upon the schedule used by other memory modules 14 in memory 12 (FIG. 1). Therefore, each memory module 14 in memory 12 may be concurrently scanned. When logic 214 generates an error detection signal, the signal is routed to access controller 212. Upon receiving an error detection signal, the access controller 212 initiates a remedial action if the error detection signal indicates that a specified memory line 202 in memory array 208 is not consistent with the corresponding error code 206 in code array 204. It is noted here that the access controller 212 also initiates a remedial action when a normal memory access operation (as opposed to a scrubbing scan operation) results in detection of an error by the error detection logic 214. As discussed next, the remedial action is preferably to send a request to another device, such as the main memory controller 40 or the CPU 20 to generate a corrected memory line using the ECC code for the memory line (or for the portion of the memory line determined to have been corrupted) and to write the corrected memory line back to memory 18.

In the embodiment of memory module 14 shown in FIG. 2, the scan initiated by scan scheduler 210 is used to simply detect corruption in array 208 rather than to correct it. Therefore, logic 214 may consist of only error detection logic rather than both error detection and error correction logic. There are several different methods for handling an error detected by error detection logic 214 in accordance with this aspect of the invention. For example, scan scheduler 210 could send a request to main memory controller 40 to correct the error using error correction logic 42 (FIG. 1). Alternatively, an interrupt request could be sent to CPU 20. In yet another alternative, separate logic (not shown) in the memory module 14 of FIG. 2 could be invoked to correct the error. The advantage of configurations in which element 214 comprises just error detection logic is that the element is much simpler and more energy efficient than embodiments in which logic 214 includes both error detection and correction logic. Another advantage of such configurations is that error detection 214 does not lie on the critical path of normal memory operations. Therefore, error correction codes that are efficient to generate and check but somewhat more difficult to apply when correcting corruption may be used. The advantage of such an ECC is that it requires fewer bits (overhead) than a corresponding ECC that is both easy to generate and check and to apply. Variations on this embodiment will be obvious for those skilled in the art. For example, memory controller 40 could generate some or all of the error code bits and send them to the memory module 14 over the communication bus 50. This would allow the ECC encoder 216 to be simplified or eliminated.

Figure 3:
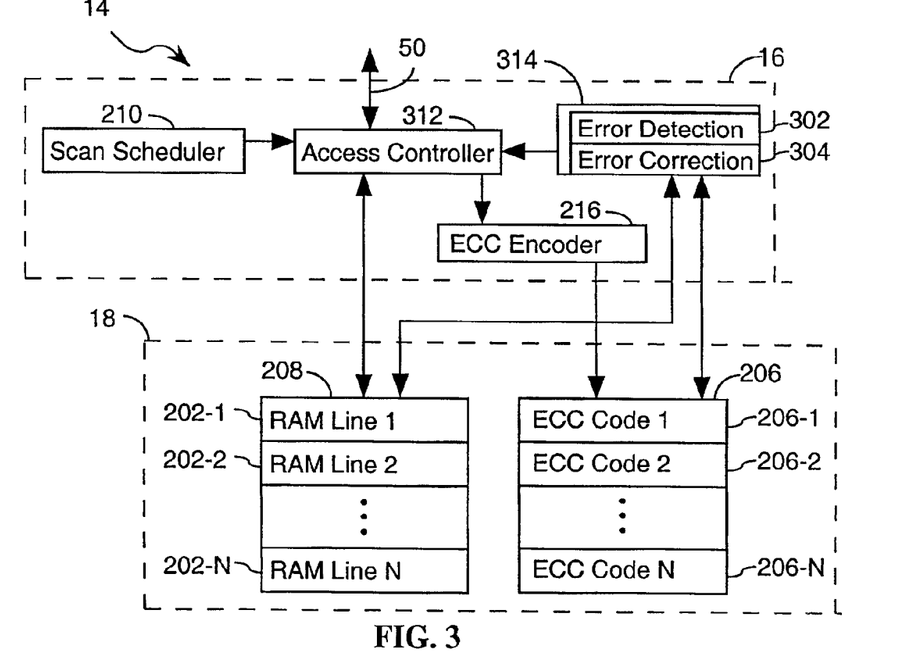
FIG. 3 is a block diagram of a memory module that includes memory controller logic and ECC RAM memory in accordance with another embodiment of the present invention.

FIG. 3 illustrates another memory module 14 in accordance with the present invention. Unless otherwise noted, the memory module 14 illustrated in FIG. 3 has the same components as the memory module 14 illustrated in FIG. 2. One distinction between the embodiments of memory module 14 shown in FIGS. 2 and 3 is the error detection logic 214 (FIG. 2) which corresponds to element 314 in FIG. 3. In FIG. 3, element 314 includes both error detection logic 302 and error correction logic 304 whereas error logic 214 in FIG. 2 includes just error detection logic. Furthermore, memory module 14 includes an access controller 312 configured to work with both error detection logic 302 and error correction logic 304. When access controller 312 receives an error detection signal from error detection logic 302, it initiates a remedial action if the error detection signal indicates that a specified memory line 202 is not consistent with a corresponding error code in error code array 206. In one embodiment, this remedial action comprises instructing error correction logic 304 to correct the error in the RAM line 202. Typically, this correction is applied by writing corrected bits for the memory line 202 and error code 206 back to memory 18. If the error in a memory line is detected during a normal memory access, as opposed to error detection during a memory scrubbing operation, typically the corrected memory line is also passed upward to the requesting device (e.g., memory controller 40).

It will be appreciated that the error detection code used by error detection logic 302 may be a subcode of the error correction code used by error correction logic 304, in which case both logic circuits 302 and 304 use the same ECC code bits. Alternatively, the error detection code may be an entirely separate code from the error correction code used by error correction circuit 304. Furthermore, any hybrid is possible. In one implementation of the present invention, the error detection code used by the error detection logic 302 includes a simple parity check bit.

In one embodiment, error correction logic 304 includes error correction logic for correcting at least a single bit error in a specified memory line 202 when the specified memory line 202 is not consistent with the corresponding error code in code array 206. Furthermore, in this embodiment, each memory module 14 is configured to detect and correct at least single bit errors in the memory lines 202 of the memory array during each successive occurrence of a predefined memory scrubbing time period.

Strengthening the ECC

Another aspect of the present invention, in which the ECC is strengthened, will now be described with reference to FIGS. 4 and 5. By assigning more bits to error correction, it is always possible to strengthen the ECC so that it can correct more corrupt bits per word. However, this complicates either the ECC generating apparatus, which generates the error correction bits from the data, the ECC correcting apparatus, which detects and corrects corrupt bits, or both. Since the ECC generating apparatus is generally interposed into every memory write and the ECC correcting apparatus into every memory read, complicating them tends to degrade memory performance.

Figure 4A:
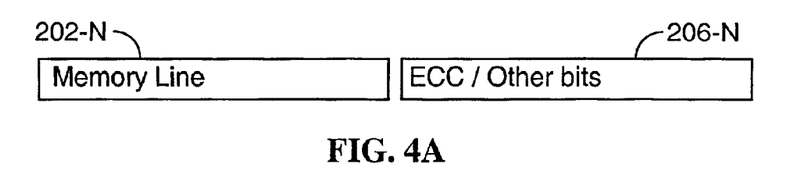
FIGS. 4A and 4B respectively show a RAM memory line with error correction code, (4A), and a RAM memory line having a plurality of distinct portions, each distinct portion including error correction code (4B).
Figure 4B:
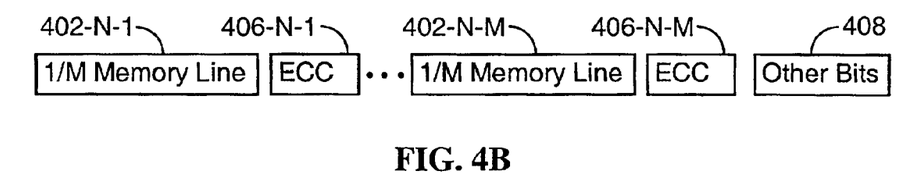

In the present invention, the problem of strengthening the ECC is addressed by reducing the size of the error correction unit, by decreasing the number of bits per word. FIGS. 4A and 4B illustrate this solution. FIG. 4A shows a memory line 202-N and the ECC bits 206-N that are associated with memory line 202-N. In FIG. 4B, the memory line 202-N is reorganized to have M distinct portions 402-N-1 through 402-N-M. In embodiments in which the memory line is reorganized to have M distinct portions, code array 206 (FIG. 3) is dimensioned and configured so that it has distinct ECC bits 406-N-M for each of the plurality of distinct portions 402-N-M. In FIG. 4B, the ECC bits 406-N-M are shown next to corresponding portions 402-N-M with other bits associated with the line are shown in separate region 408.

To understand the advantages of the structure shown in FIG. 4B, consider the case in which an ECC capable of correcting any single corrupt bit per word is used. If the memory is reorganized by cutting the word size in half, the total number of bits in the memory remains the same but the number of words in memory doubles. If it is assumed that the scanning bandwidth in bits/second remains unchanged, the interval between checks of the a given word remains the same. The original system has some expected rate of encountering words containing one corrupt bit, and this rate is the same in the reorganized system. A system failure occurs with approximately the conditional probability that a second corruption occurs in a word that was already "fated" to contain one corrupt bit. Since the reorganized system contains half as many bits per word, this conditional probability is roughly half that for the original system; that is, the reorganization approximately doubles the MTBF.

Of course, strengthening the ECC in the manner shown in FIG. 4B has a cost. In the case where the word size is halved, the cost is that a greater proportion of bits per word, roughly, double, must be allocated to error correction. However, the advantage of the architecture shown in FIG. 4B is that no significant complication to the generating or correcting apparatus is required. All that is needed in the reorganized system is to employ two copies of an ECC apparatus in parallel where one was present before.

Figure 5A:
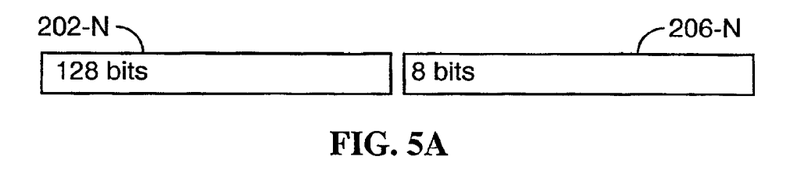
FIGS. 5A and 5B show the organization of a RAM memory line before (5A) and after (5B) division of a 136 bit word in half.
Figure 5B:
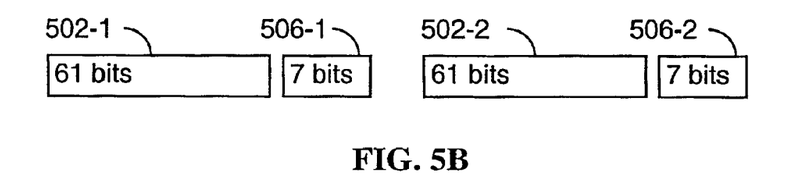

FIGS. 5A and 5B, illustrate an example of this aspect of the invention, where a 136-bit word is divided in half. In FIG. 5A, the ECC generating apparatus takes 128 data bits (202-N) and generates 8 bits error correcting code (206-N), making a 136-bit word that is stored in memory. On a read operation in accordance with FIG. 5A, memory delivers a 136-bit word to the ECC correcting apparatus which repairs errors in data bits 202-N and delivers the original 128 data bits. Moving to FIG. 5B the word illustrated in FIG. 5A is divided in half, producing a 61 bit data portion 502-1 with a corresponding 7 bit ECC 506-1 as well as a 61 bit data portion 502-2 with a corresponding 7 bit ECC 506-2. From the point of view of memory, the divided word of FIG. 5A looks the same as the undivided word of FIG. 5B, each write operation stores 68+68=136 bits into memory and each read operation gets 68+68=136 bits from memory. However, the 136 bits are actually organized into two separate tracks each handling 68 bits. Each track has its own ECC generating apparatus and its own ECC correcting apparatus.

It will be appreciated that the overhead in error correction bits is higher in FIGS. 4B and 5B, relative to the corresponding organization of FIGS. 4A and 5A. When a single bit error correcting code is used, a word size of 68 bits can only handle 61 bits of data because 7 bits are required for error correction. Hence the split system of FIG. 5B can only store 122 bits of data at each address versus the original system which could store 128 bits of data (FIG. 5A), assuming that each memory line is limited to a total of 136 bits, including both data and error code bits. Each of the two ECC generating apparatuses in the split system is slightly simpler than the single ECC generating apparatus in the original system, because they support fewer data bits.

The advantage of the memory line organization shown in FIGS. 4B and 5B is that the probability of encountering an uncorrectable pattern of corrupt bits is lowered for a given scan rate. Thus a scan rate that otherwise would be too slow for an acceptable MTBF is now suitable.

In an alternate embodiment, the memory line size is increased so that when each memory line of 128 data bits is split into two, the result is two 64-bit half-memory lines, each having a 7 bit error code, for a total of 142 bits per memory line. This requires six bits more storage than the memory lines in FIGS. 4A and 5A.

Figure 6:
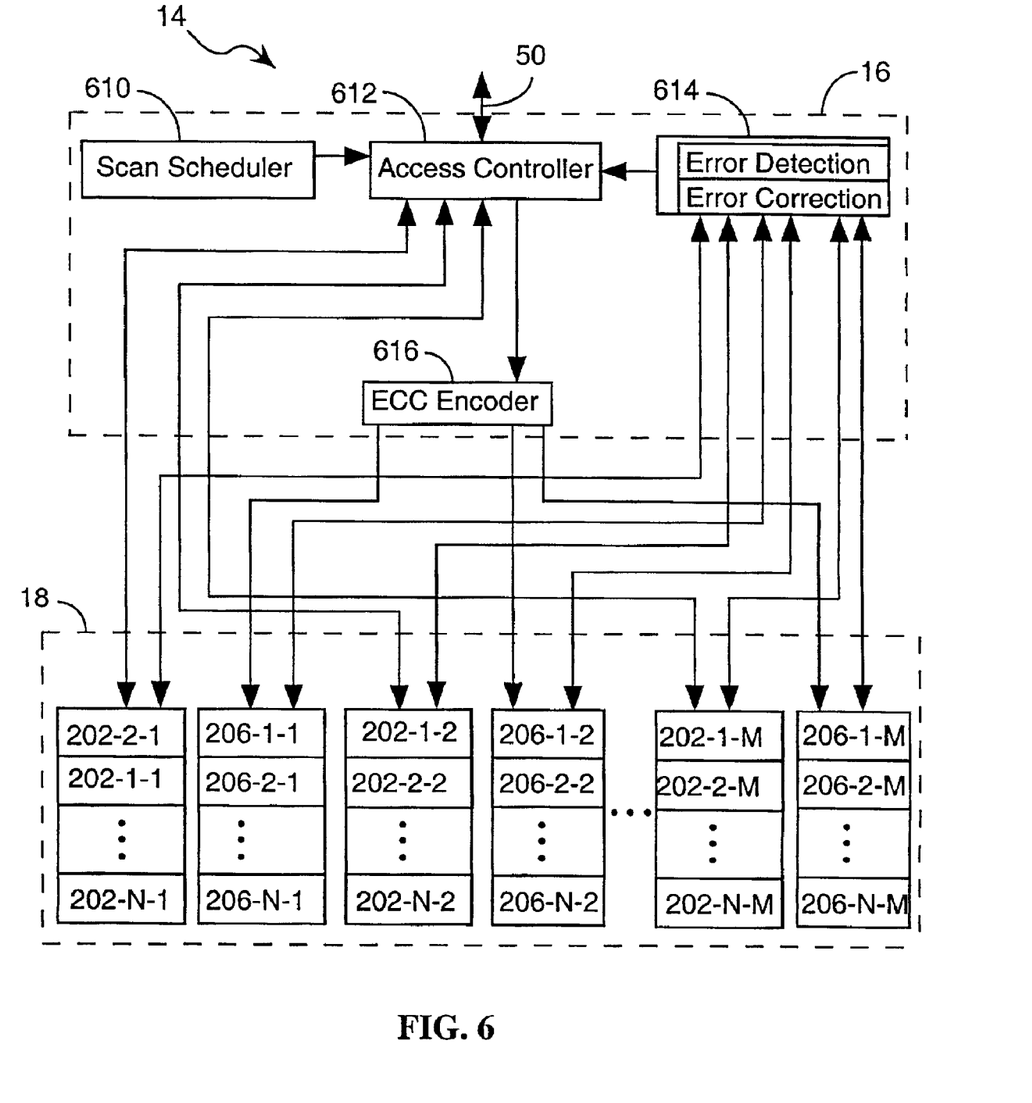
FIG. 6 is a block diagram of an exemplary system that includes a plurality of memory modules, each RAM memory line in each memory module including a plurality of distinct portions, each distinct portion having a corresponding error correction code.

FIG. 6 shows the architecture of a memory module 14 that uses the split memory line architecture illustrated in FIG. 4B. In FIG. 6, a memory bus 50 connects the memory module 14 to other components of system 12. The memory module 14 includes a memory array in which each memory line N is split into M distinct portions (202-N-M), each portion 202-N-M having a corresponding error code 206-N-M. Thus, the memory module 14 of FIG. 6 includes an error code set for each memory line (206-N-1 through 206-N-M). Each error code set has a distinct error code for each of the distinct portions of the corresponding memory line. In additional to the memory array and code array, the memory module of FIG. 6 includes an access controller (access logic) 612 for accessing memory lines in the memory array. When access controller 612 writes a word to memory, the word is split into M distinct portions (202-N-M) and error encoder 616 encodes the corresponding distinct error code set 206-N-M. Error logic 614, which is coupled to the memory array (202-N-M) and code array (206-N-M), determines whether any of the portions 202-N-M of a specified memory line in the memory array is inconsistent with the corresponding error code 206-N-M. When an inconsistency is encountered, error logic 614 generates a corresponding error detection signal. Finally, the memory module of FIG. 6 includes a scheduler 610, coupled to access controller 612, for initiating reading of memory lines in the memory array in accordance with a memory scrubbing schedule. When access controller 612 receives an error detection signal, indicating that a portion of a specified memory line is not consistent with the corresponding error code in the code array, a remedial action is initiated by the access controller 612.

The advantage of the memory module of FIG. 6 is that each memory module 14 in a system 12 may be concurrently scrubbed. Furthermore, the scan rate for each of these memory modules may be reduced because of the strengthened ECC. Accordingly, an architecture such as that of FIG. 6 will provide acceptable MTBF rates in very large memory systems

REFERENCES CITED

All references cited herein are incorporated herein by reference in their entirety and for all purposes to the same extent as if each individual publication or patent or patent application was specifically and individually indicated to be incorporated by reference in its entirety for all purposes.

CONCLUSION

The present invention is not to be limited in scope by the exemplified embodiments, which are intended as illustrations of single aspects of the invention. Indeed, various modifications of the invention in addition to those described herein will become apparent to those having skill in the art from the foregoing description and accompanying drawings. Such modifications are intended to fall with in the scope of the appended claims.

What is claimed is:

1. A memory system, comprising, a memory bus;

a plurality of memory modules coupled to the memory bus, each memory module including:

a memory array organized for access into a plurality of memory lines;

a code array for storing error codes,including a distinct error code for each of the plurality of memory lines;

error logic, coupled to the memory array and code array, for determining whether any specified memory line in the memory array is not consistent with the corresponding error code in the code array and generating a corresponding error detection signal;

access logic for accessing memory lines in the memory array, receiving from the error logic the error detection signal, and initiating a remedial action when the error detection signal indicates that a specified memory line is not consistent with the corresponding error code in the code array; and a scheduler, coupled to the access logic, for initiating reading of the memory lines in the memory array in accordance with a memory scrubbing schedule;

wherein each said memory module in the plurality of memory modules concurrently performs memory scrubbing in accordance with the memory scrubbing schedule.

2. The memory system of claim 1, wherein the scheduler of each memory module in said plurality of memory modules is configured to ensure a scrubbing of at least single bit errors in the memory lines of the memory array during each successive occurrence of a predefined memory scrubbing time period.

3. The memory system of claim 1, wherein the error logic includes error correction logic for correcting at least a single bit error in the specified memory line when the specified memory line is not consistent with the corresponding error code in the code array; and each memory module is configured to remove at least single bit errors in the memory lines of the memory array during each successive occurrence of a predefined memory scrubbing time period.

4. A memory system, comprising, a memory bus;

a plurality of memory modules coupled to the memory bus, each memory module including:

a memory array organized for access into a plurality of memory lines of predefined size, each memory line having a plurality of distinct portions;

a code array for storing error codes, including a distinct error code set for each of the plurality of memory lines, each error code set including a plurality of error codes with a distinct error code for each of the plurality of distinct portions of the associated memory line;

error logic, coupled to the memory array and code array, for determining whether any of the portions of a specified memory line in the memory array is not consistent with the corresponding error code in the code array and generating a corresponding error detection signal;

access logic for accessing memory lines in the memory array, receiving from the error logic the error detection signal, and initiating a remedial action when the error detection signal indicates that any portion of a specified memory line is not consistent with the corresponding error code in the code array; and a scheduler, coupled to the access logic, for initiating reading of the memory lines in the memory array in accordance with a memory scrubbing schedule;

wherein each said memory module in the plurality of memory modules concurrently performs memory scrubbing in accordance with the memory scrubbing schedule.

5. The memory system of claim 4, wherein the scheduler of each memory module in said plurality of memory modules is configured to ensure a scrubbing of at least single bit errors in the memory lines of the memory array during each successive occurrence of a predefined memory scrubbing time period.

6. The memory system of claim 4, wherein the error logic includes error correction logic for correcting at least a single bit error in the specified memory line when any portion of the specified memory line is not consistent with the corresponding error code in the code array; and each memory module is configured to remove at least single bit errors in the memory lines of the memory array during each successive occurrence of a predefined memory scrubbing time period.

7. A memory module, comprising, a memory array organized for access into a plurality of memory lines of predefined size, each memory line having a plurality of distinct portions;

a code array for storing error codes, including a distinct error code set for each of the plurality of memory lines, each error code set including a plurality of error codes with a distinct error code for each of the plurality of distinct portions of the associated memory line;

error logic, coupled to the memory array and code array, for determining whether any of the portions of a specified memory line in the memory array is not consistent with the corresponding error code in the code array and generating a corresponding error detection signal;

access logic for accessing memory lines in the memory array, receiving from the error logic the error detection signal, and initiating a remedial action when the error detection signal indicates that any portion of a specified memory line is not consistent with the corresponding error code in the code array; and a scheduler, coupled to the access logic, for initiating reading of the memory lines in the memory array in accordance with a memory scrubbing schedule.

8. The memory module of claim 7, wherein the scheduler of said memory module is configured to ensure a scrubbing of at least single bit errors in the memory lines of the memory array during each successive occurrence of a predefined memory scrubbing time period.

9. The memory module of claim 7, wherein the error logic includes error correction logic for correcting at least a single bit error in the specified memory line when any portion of the specified memory line is not consistent with the corresponding error code in the code array; and the memory module is configured to remove at least single bit errors in the memory lines of the memory array during each successive occurrence of a predefined memory scrubbing time period.

10. A method of memory scrubbing in a plurality of memory modules coupled to a memory bus, each memory module including a plurality of memory lines organized into a memory array so that each memory line is accessible, for each memory module, the method comprising:

maintaining a code array that includes a distinct error code for each of the plurality of memory lines in the memory array associated with the memory module;

generating an error detection signal that corresponds to a specified memory line in the memory array when any portion of the specified memory line is not consistent with the corresponding error code in the code array;

initiating the reading of the memory lines in the memory array associated with the module in accordance with a memory scrubbing schedule; and initiating a remedial action when the error detection signal indicates that the specified memory line is not consistent with the corresponding error code in the code array;

wherein each said memory module in the plurality of memory modules concurrently performs memory scrubbing in accordance with the memory scrubbing schedule.

11. The method of claim 10 wherein the memory scrubbing ensures that at least single bit errors in the memory lines of the memory array are scrubbed during each successive occurrence of a predefined memory scrubbing time period.

12. The method of claim 10, wherein said generating step further including the step of correcting at least a single bit error in the specified memory line when any portion of the specified memory line is not consistent with the corresponding error code in the code array; and each memory module in the plurality of memory modules is configured to remove at least single bit errors in the memory lines of the memory array during each successive occurrence of a predefined memory scrubbing time period.

13. A method of memory scrubbing in a plurality of memory modules coupled to a memory bus, each memory module including a plurality of memory lines of predefined size, each memory line having a plurality of distinct portions, the plurality of memory lines organized into a memory array so that each memory line is accessible, for each memory module, the method comprising:

maintaining a code array that includes a distinct error code set for each of the plurality of memory lines in the memory array associated with the memory module, each error code set including a plurality of error codes with a distinct error code for each of the plurality of distinct portions of the associated memory line;

generating an error detection signal that corresponds to a specified memory line in the memory array when any of the portions of the specified memory line is not consistent with the corresponding error code in the code array;

initiating the reading of the memory lines in the memory array associated with the module in accordance with a memory scrubbing schedule; and initiating a remedial action when the error detection signal indicates that any portion of the specified memory line is not consistent with the corresponding error code in the code array;

wherein each said memory module in the plurality of memory modules concurrently performs memory scrubbing in accordance with the memory scrubbing schedule.

14. The method of claim 13, wherein the memory scrubbing ensures that at least single bit errors in the memory lines of the memory array are scrubbed during each successive occurrence of a predefined memory scrubbing time period.

15. The memory system of claim 13, the generating step further including the step of correcting at least a single bit error in the specified memory line when any portion of the specified memory line is not consistent with the corresponding error code in the code array; and each memory module in the plurality of memory modules is configured to remove at least single bit errors in the memory lines of the memory array during each successive occurrence of a predefined memory scrubbing time period.

16. A method of memory scrubbing in a memory module, the memory module including a plurality of memory lines of predefined size, each memory line having a plurality of distinct portions, the plurality of memory lines organized into a memory array so that each memory line is accessible, the method comprising:

maintaining a code array that includes a distinct error code set for each of the plurality of memory lines, each error code set including a plurality of error codes with a distinct error code for each of the plurality of distinct portions of the associated memory line;

generating an error detection signal that corresponds to a specified memory line in the memory array when any of the portions of the specified memory line is not consistent with the corresponding error code in the code array;

initiating the reading to the memory lines in the memory array associated with the module in accordance with a memory scrubbing schedule; and initiating remedial action when the error detection signal indicates that any portion of the specified memory line is not consistent with the corresponding error code in the code array.

17. The method claim 16, wherein the memory scrubbing ensures that at least single bit errors in the memory lines of the memory array are scrubbed during each successive occurrence of a predefined memory scrubbing time period.

18. The method of claim 16, wherein the generating step further includes the step of correcting at least a single bit error in the specified memory line when any portion of the specified memory line is not consistent with the corresponding error code in the code array; and the memory module is configured to remove at least single bit errors in the memory lines of the memory array during each successive occurrence of a predefined memory scrubbing time period.

* * * * *

UNITED STATES PATENT AND TRADEMARK OFFICE
CERTIFICATE OF CORRECTION

PATENT NO. : 6,848,063 B2
APPLICATION NO. : 09/989357
DATED : January 25, 2005
INVENTOR(S) : Thomas Lee Rodeheffer et al.

It is certified that error appears in the above-identified patent and that said Letters Patent is hereby corrected as shown below:

In column 14, line 39, in Claim 17, after "method" insert -- of --.

Signed and Sealed this

Twenty-eighth Day of July, 2009

JOHN DOLL
*Acting Director of the United States Patent and Trademark Office*